(12) United States Patent
Girg et al.

(10) Patent No.: US 7,425,589 B2
(45) Date of Patent: Sep. 16, 2008

(54) METHOD FOR MODIFYING CELLULOSE ETHERS

(76) Inventors: Friedrich Girg, Wallbacher Strasse 36, 65510 Idstein (DE); Roland Friedel, Neue Heimat 37, 65399 Kiedrich (DE); Alf Hammes, Marie-Juchacz-Strasse 21, 55252 Mainz-Kastel (DE)

( * ) Notice: Subject to any disclaimer, the term of this patent is extended or adjusted under 35 U.S.C. 154(b) by 0 days.

(21) Appl. No.: 10/344,960

(22) PCT Filed: Aug. 21, 2001

(86) PCT No.: PCT/EP01/09603

§ 371 (c)(1),
(2), (4) Date: Jan. 28, 2004

(87) PCT Pub. No.: WO02/26835

PCT Pub. Date: Apr. 4, 2002

(65) Prior Publication Data

US 2004/0106729 A1      Jun. 3, 2004

(30) Foreign Application Priority Data

Aug. 23, 2000   (DE) .................... 100 41 311

(51) Int. Cl.
C08L 1/00    (2006.01)
C08L 1/26    (2006.01)
C08L 5/00    (2006.01)
D06P 1/44    (2006.01)

(52) U.S. Cl. ................ 524/35; 524/42; 524/43; 524/44; 524/45; 524/46; 106/162.8; 106/162.82; 106/171.1

(58) Field of Classification Search ............ 524/35, 524/42, 43, 44, 45, 46; 106/162.8, 162.82, 106/172.1, 171.1
See application file for complete search history.

(56) References Cited

U.S. PATENT DOCUMENTS

| | | | | |
|---|---|---|---|---|
| 3,268,459 A | | 8/1966 | Luck et al. | ............ 524/43 |
| 4,056,402 A | * | 11/1977 | Guzi, Jr. | ............ 106/194.2 |
| 4,228,277 A | * | 10/1980 | Landoll | ............ 536/90 |
| 4,330,441 A | * | 5/1982 | Bohmer et al. | ............ 525/54.23 |
| 4,415,124 A | * | 11/1983 | Carduck et al. | ............ 244/28 |
| 4,588,772 A | | 5/1986 | Bohmer et al. | ............ 525/54.23 |
| 4,654,085 A | | 3/1987 | Schinski | ............ 524/5 |
| 4,853,437 A | | 8/1989 | Lukach et al. | ............ 525/54.21 |
| 4,979,681 A | * | 12/1990 | Donges et al. | ............ 241/17 |
| 5,346,541 A | * | 9/1994 | Goldman et al. | ............ 106/162.8 |
| 5,387,626 A | * | 2/1995 | Bohme-Kovac et al. | ............ 524/35 |
| 5,487,777 A | * | 1/1996 | Lundan et al. | ............ 106/194.2 |
| 5,837,048 A | * | 11/1998 | Kelley | ............ 106/197.01 |
| 6,197,100 B1 | * | 3/2001 | Melbouci | ............ 106/174.1 |
| 2001/0021387 A1 | * | 9/2001 | Krammer et al. | ............ 424/401 |

FOREIGN PATENT DOCUMENTS

| | | |
|---|---|---|
| CA | 2 053 914 | 10/1990 |
| DE | 39 10 742 | 10/1990 |
| DE | 39 12 983 | 10/1990 |
| DE | 39 13 518 | 10/1990 |
| DE | 39 20 025 | 1/1991 |
| EP | 0 056 360 | * 7/1982 |
| FR | 1 487 506 | 8/1993 |

OTHER PUBLICATIONS

English abstract for FR 1487506, Aug. 31, 1993.
English abstract for DE 3910742, Oct. 4, 1990.
English abstract for DE 3913518, Oct. 31, 1990.
English abstract for DE 3920025, Jan. 3, 1991.

* cited by examiner

*Primary Examiner*—Nathan M Nutter
(74) *Attorney, Agent, or Firm*—Roberts & Roberts, LLP

(57) ABSTRACT

The invention relates to a method for modifying cellulose ethers. The inventive method is characterised in that a cellulose ether having a humidity content of between 5 and 90% is intensively mixed with between 0.1 and 5 wt. %—in relation to the dry cellulose ether—of an additive or an additive mixture in the form of an aqueous or organic suspension or solution, at temperatures of between 20 and 100° C., and the mixture obtained is then dried.

16 Claims, No Drawings

METHOD FOR MODIFYING CELLULOSE ETHERS

On account of their outstanding properties and their physiological safety, cellulose ethers have many uses, for example as thickeners, adhesives, binding agents, dispersing agents, water-retaining agents, protective colloids and stabilizers, and also as suspending agents, emulsifying agents and film-forming agents.

It has been known for a long time that combining cellulose ethers with other additives, loading agents or auxiliary agents in application-technology formulations opens up possibilities of developing optimized approaches for solving specific problems in a very wide variety of areas.

Thus, DE-A-39 13 518 reports, for example, that the processing properties of cement mortars are improved if synthetic polymer compounds, in particular polyacrylamides, are added, together with starch ethers, to the cellulose ether as a pulverulent mixture.

In DE-A-39 20 025, a combination composed of pulverulent thickeners, e.g. modified polyacrylamides, and liquifiers is added to the cellulose ethers in order to produce a similar effect.

However, in both cases, the ready-to-use cellulose ether powder is either incorporated in the dry state into the bulk blend to be modified or premixed with other additives to form an additive mixture and then added directly to the bulk blend to be modified prior to processing.

DE-A-33 39 860 describes the chemical reaction of cellulose ethers with polyacrylamides and cross-linker components to give chemically modified cellulose ethers which have improved processing properties. These compounds can advantageously be employed in asbestos-free tile adhesive formulations.

Another approach to what is more of a "physical" modification of cellulose ethers is described in DE-A-39 12 983. In this publication, a fine-grained dry powder is produced on the basis of mixing nonionogenic cellulose ethers with redispersion polymers, for example based on polyvinyl acetate. This is done by mixing essentially equal proportions of the aqueous dispersions of redispersion powders with cellulose ethers at a temperature above the flocculation point of the cellulose ethers and subsequently spray drying the resulting dispersion (solids content from approx. 15 to 60%) at elevated temperature. This results in fine-grained dry powders which predominantly comprise cores of the nonionogenic cellulose ethers which are surrounded by a sheath of the redispersion polymer and linked to this sheath in a well-bonded manner. As compared with a powder mixture of the individual components which is subsequently prepared, a dry powder which is prepared in this way has the advantage that it does not demix and can be stirred into water free from dust and lumps. However, spray drying cellulose ethers at temperatures above the flocculation point is substantially more time-consuming, labor-intensive and machine-intensive and, because of the high energy consumption, economically more disadvantageous, than the current drying and grinding and subsequent mixing of the final powders.

The object of the present invention was therefore to develop a process for modifying cellulose ethers which is used to obtain cellulose ethers which exhibit improved processing properties and which, when being used, offer advantages as compared with unmodified cellulose ethers. These advantages are, in particular, superior stability and easier processing when being used in sprayed renderings.

This object is achieved by means of a process for "physically" modifying cellulose ethers, which process is characterized in that a cellulose ether having a moisture content of from 5 to 90% is mixed intensively, at temperatures of from 20 to 100° C., preferably of from 20 to 60° C., with from 0.1 to 5% by weight, based on the dry cellulose ether, of an additive or of an additive mixture in the form of an aqueous organic suspension or solution, and the resulting mixture is subsequently dried.

The cellulose ethers which can be employed are all known cellulose ethers, such as methyl cellulose, ethyl cellulose, propyl cellulose, butyl cellulose, carboxymethyl cellulose and hydroxyethyl cellulose, and also binary mixed ethers, such as methylhydroxyethyl cellulose, methylhydroxypropyl cellulose and ethylhydroxyethyl cellulose, or ternary mixed ethers.

In this connection, the moisture content of the cellulose ether which is employed is preferably in the range from 30 to 75% and particularly preferably in the range from 40 to 70%.

When the quantity of the additive or additive mixture is specified, the content of water or organic solvent is disregarded. Instead, the quantity which is specified is generally the value which has already been corrected for the moisture content of the additive or the additive mixture. Preference is given to adding from 0.1 to 2% by weight of an additive or of an additive mixture, based on the dry cellulose ether.

The additives which are employed are preferably natural and synthetic polymers based on polyacrylamide, homopolymers or copolymers based on polyvinyl acetate, vinyl acetate-maleate copolymers, ethylene-vinyl acetate copolymers, acrylate and/or methacrylate homopolymers and/or copolymers or polyurethanes, and also mixtures thereof.

In a preferred embodiment, the additive or the additive mixture is added in the form of an aqueous suspension or solution.

In another embodiment, the water-moist or dry cellulose ether having a moisture content of from 5 to 90% can initially be suspended in an organic solvent before it is mixed, at temperatures of from 20 to 60° C. with an aqueous or organic suspension or solution of an additive or an additive mixture. A suitable device can then be used to separate off the organic suspending agent prior to the drying.

Acetone, diethyl ether and its higher homologs, dimethoxyethane and its higher homologs, aliphatic and cyclic hydrocarbons and aromatic compounds are preferably suitable for preparing a suspension of the cellulose ether in an organic solvent.

The drying which follows the mixing and/or the removal of the organic suspending agent can then be carried out in a single-step or multistep process. At the same time as the drying, or following on from it, the mixture can be subjected to grinding. In connection with this, the grinding parameters can be adjusted to correspond to the desired particle size distribution. Any devices which are known to the skilled person can be used for drying or grinding the mixture. However, preference is given to using devices for mill drying, which can be used to grind and dry the mixture simultaneously in one step.

The temperature to which the modified cellulose ether is subjected during the course of the drying and/or grinding is preferably at least 60° C., particularly preferably from 80 to 160° C.

It has been found, surprisingly, that, when additives or additive mixtures are worked into cellulose ethers intensively, small quantities of at most 5% by weight, based on the cellulose ether to be modified, are already adequate to give rise to cellulose ethers which lead to markedly superior properties in formulations which are relevant from the point of view of application technology. These superior properties are either not found at all, or are only found when a substantially higher quantity of additive is used, in the case of the dry mixing of pulverulent individual components which is customary in the state of the art.

In contrast to the mixture described in DE-A 39 12 983, the quantity of additive employed of at most 5% by weight is not sufficient to enclose the major portion of the cellulose ether with a polymeric sheath. Despite this, intensive mixing succeeds, in accordance with the invention, in incorporating the polymer uniformly, and not merely absorbing it superficially, in the cellulose ether.

The invention is described in more detail below with the aid of implementation examples without, however, being restricted thereby.

The viscosities are determined on 1.9% solutions, based on the cellulose ether, in a Höppler falling bore viscometer; the contents of the substituents ($OCH_3$, $OC_2H_4$) are determined by Zeisel decomposition.

Modifying, in accordance with the invention, cellulose ethers which have been prepared in accordance with the state of the art:

EXAMPLE 1a

Comparative Example 210 g of a moist methylhydroxyethyl cellulose (dry solids content 31.5%, approx. 60 000 mPas, 26% $OCH_3$, 4.5% $OC_2H_4$) are intensively kneaded, at from 60 to and 70° C. and for 3 hours, in a kneading unit supplied by Draiswerke GmbH (Mannheim, Waldhof). After that, the material is dried at 70° C. and comminuted on a commercially available grinding mill while selecting suitable milling parameters such that the following particle size distribution is obtained:

from 40 to 60% <63 μm
>70% <100 μm
>90% <125 μm

EXAMPLE 1b 210 g of a moist methylhydroxyethyl cellulose (starting material from Example 1a) are intensively mixed in a kneading unit, at from 60 to 70° C. and for 3 hours, with 1.32 g of an aqueous polymer dispersion comprising a polyvinyl acetate-ethylene copolymer which has a solids content of 50% and which is prepared by redispersing a dispersion polymer (®Mowilith DM 1140 P) produced by Clariant GmbH (1% by weight based on the cellulose ether, absolutely dry). After that, the compound which has been prepared is dried at 70° C. and comminuted on a commercially available grinding mill while selecting suitable milling parameters, as described above.

EXAMPLE 1c 210 g of a moist methylhydroxyethyl cellulose (starting material from Example 1a) are intensively mixed in a kneading unit, at from 60 to 70° C. and for 3 hours, with 6.6 g of an aqueous polymer dispersion from Example 1b (5% by weight based on the cellulose ether, absolutely dry). After that, the compound which has been prepared is dried at 70° C. and comminuted on a commercially available grinding mill while selecting suitable milling parameters, as described above.

EXAMPLE 2a

Comparative Example 210 g of a moist methylhydroxyethyl cellulose (dry solids content 53%, 250 000 mPas, 28% $OCH_3$, 5% $OC_2H_4$) are intensively kneaded, at from 60 to 70° C. and for 3 hours, in a kneading unit supplied by Draiswerke GmbH. After that, the material is dried at 70° C. and comminuted on a commercially available grinding mill while selecting suitable milling parameters, as described above.

EXAMPLE 2b 210 g of a moist methylhydroxyethyl cellulose (starting material from Example 2a) are intensively mixed in a kneading unit, at from 60 to 70° C. and for 3 hours, with 2.64 g of an aqueous polymer dispersion from Example 1b (1.2% by weight based on the cellulose ether, absolutely dry). After that, the compound which has been prepared is dried at 70° C. and comminuted on a commercially available grinding mill while selecting suitable milling parameters, as described above.

EXAMPLE 2c 210 g of a moist methylhydroxyethyl cellulose (starting material from Example 2a) are intensively mixed in a kneading unit, at from 60 to 70° C. and for 3 hours, with 6.6 g of an aqueous polymer dispersion from Example 1b (3% by weight based on the cellulose ether, absolutely dry). After that, the compound which has been prepared is dried at 70° C. and comminuted on a commercially available grinding mill while selecting suitable milling parameters, as described above.

EXAMPLE 3a

Comparative Example 2600 g of a moist methylhydroxyethyl cellulose (dry solids content 23%, 650 000 mPas, 27% $OCH_3$, 4% $OC_2H_4$) are intensively kneaded in a kneading unit at room temperature for 30 minutes. After that, the material is ground, while simultaneously being dried, on a commercially available, heated grinding mill at a grinding mill temperature of from approx. 70 to 90° C., with the milling parameters being selected such that the above-described particle size distribution is obtained.

EXAMPLE 3b 2600 g of a moist methylhydroxyethyl cellulose (starting material from Example 3a) are intensively mixed in a kneading unit, at room temperature and for 30 minutes, with 10 g of an aqueous polymer dispersion comprising a polyvinylacetate-ethylene copolymer which has a solids content of 60% and which is prepared by redispersing a dispersion powder (®Mowilith DM 1140 P) produced by Clariant GmbH (1% by weight based on the cellulose ether, absolutely dry). After that, the compound which has been prepared is ground, while simultaneously being dried, on a commercially available, heated grinding mill at a grinding mill temperature of from approx. 70 to 90° C., with the milling parameters being selected such that the above-described particle size distribution is obtained.

EXAMPLE 3c 2600 g of a moist methylhydroxyethyl cellulose (starting material from Example 3a) are intensively mixed in a kneading unit, at room temperature and for 30 minutes, with 30 g of an aqueous polymer dispersion from Example 3b (3% by weight based on the cellulose ether, absolutely dry).

After that, the compound which has been prepared is ground, while simultaneously being dried, on a commercially available, heated grinding mill at a grinding mill temperature of from approx. 70 to 90° C., with the milling parameters being selected such that the above-described particle size distribution is obtained.

The application-technology testing of the modified cellulose ethers which were prepared is described below.

EXAMPLES 4 TO 9

In a laboratory experiment, the modified cellulose ethers described in Examples 1b and 1c are tested, in an exemplary gypsum plaster mixture, against the unmodified material described in Comparative Example 1a.

As can be seen from Table 1, the cellulose ethers which were modified with the polymer dispersion within the context of the process according to the invention possess, in particular, on account of a delayed thickening effect and a readily plasticizing behavior, the desired property of easier workability, thereby reducing both working-up time and working-up input.

EXAMPLES 10 TO 15

The modified cellulose ethers described in Examples 2b and 2c are tested, in an exemplary gypsum plaster mixture, against the unmodified material described in Comparative Example 2a.

As Table 2 shows, even when the viscosity level of the cellulose ether is higher than that of the material used in Examples 1a, 1b and 1c, the positive application-technology properties can be observed in a laboratory experiment.

In order to reproduce the results on a larger scale, and to work out differences more clearly, spraying experiments are carried out in addition to the laboratory experiments. For this, the modified cellulose ethers described in Examples 3b and 3c are tested, in an exemplary gypsum plaster mixture, against the unmodified material described in Comparative Example 3a (Examples 16 to 22).

EXAMPLES 16 TO 18

In each case, 0.30% by weight of MHEC from Examples 3a, 3b and 3c, based on the masterbatch, is added to a masterbatch 1. However, the MHEC consists of a premix of the cellulose ethers described in Examples 3a, 3b and 3c which are additionally modified with in each case 1.5% by weight of cothickener, based on the cellulose ether. The premix composed of cellulose ethers and cothickener is prepared by intensively mixing the pulverulent components.

EXAMPLES 19 TO 22

In each case, 0.30% by weight of MHEC, based on the masterbatch, and specifically consisting of a premix composed of the material from Example 3a (Examples 19, 21 and 22) and Example 3b (Example 20), which materials contain 1.5% by weight of cothickener, based on the cellulose ether, is added to a masterbatch 2.

In Examples 21 and 22, the masterbatch is mixed, in addition to being mixed with the premix composed of cellulose ether described in Example 3a and cothickener, with the equivalent of 1% (Example 21) and 33% (Example 22), based on MHEC, of dry dispersion powder. The quantity employed is therefore approx. 0.003 (Example 21) and 0.1 (Example 22) % by weight, respectively, based on the masterbatch.

The dispersion powders of Examples 21 and 22 are prepared by spray drying the aqueous polymer dispersions described in Examples 3b and 3c using a conventional process such that a dispersion powder having a moisture content of less than 5% is obtained.

As can be seen from Tables 3 and 4, the spraying picture obtained when using a spray rendering containing the modified cellulose ether described in Example 3b (Examples 17 and 20) is more uniform than that of a spray rendering containing the unmodified cellulose ether described in Comparative Example 3a (Examples 16 and 19). In addition to this, it is possible to carry out the 1 st and 2nd levelings of the rendering to produce a more uniform surface while using less force and with there in some cases being less of a tendency to form nodules.

The spray rendering which contains the modified cellulose ether described in Example 3c, which is modified with 3% by weight of dispersion (Example 18), also exhibits a superior finishing behavior. However, because of less development of consistency at the beginning, the spraying picture for this spray rendering mixture is somewhat less uniform than that of the spray rendering from Example 17, which also contains the cellulose ether described in Example 3c but which is only modified with one percent by weight of dispersion.

The spray rendering mixture from Example 21, to which the spray-dried pulverulent dispersion powder was added in a quantity comparable to that in Example 20 (1% by weight of dispersion powder, based on the cellulose ether), does not exhibit any superior finishing properties as compared with the spray rendering from Example 19, which does not contain any cellulose ether which has been modified in accordance with the invention. As Example 22 shows, a larger quantity of dispersion powder has to be added in order to produce a slight improvement in connection with the 1st leveling of the spray rendering. However, despite using a greater quantity of dispersion powder, the processing properties shown by the spray rendering mixture from Example 20, which contains the modified cellulose ether described in Example 3b, are not achieved.

TABLE 1

| | Example No. | | | | | |
| --- | --- | --- | --- | --- | --- | --- |
| | 4 | 5 | 6 | 7 | 8 | 9 |
| Composition | PW | PW | PW | PW | PW | PW |
| Gypsum plaster mixture (without MHEC) | 1000 | 1000 | 1000 | 1000 | 1000 | 1000 |

TABLE 1-continued

|  | Example No. | | | | | |
| --- | --- | --- | --- | --- | --- | --- |
|  | 4 | 5 | 6 | 7 | 8 | 9 |
| MHEC Example 1a (comparative example) | 2.5 | — | — | 2.425 | — | — |
| MHEC Example 1b (1% dispersion) | — | 2.5 | — | — | 2.425 | — |
| MHEC Example 1c (5% dispersion) | — | — | 2.5 | — | — | 2.425 |
| Cothickener | — | — | — | 0.075 | 0.075 | 0.075 |
| Water[1] | 630 | 630 | 630 | 680 | 680 | 680 |
| Properties: | without cothickener | | | with cothickener | | |
| Consistency | good | delayed thickening, slightly plasticizing | delayed thickening, somewhat more strongly plasticizing than 5 | very good | delayed thickening, slightly plasticizing | delayed thickening, somewhat more strongly plasticizing than 8 |
| Working | satisfactory | easier & better than 4 | easier & better than 4 | good | easier & better than 7 | easier & better than 7 |
| Non-sag performance | satisfactory | satisfactory | satisfactory | good | good | good |
| Agglomeration | yes | yes | yes | slight | slight | slight |

[1] Mixing the mortar: 45 s of manual stirring
PW: parts by weight
MHEC: methylhydroxyethyl cellulose

TABLE 2

|  | Example No. | | | | | |
| --- | --- | --- | --- | --- | --- | --- |
|  | 10 | 11 | 12 | 13 | 14 | 15 |
| Composition | PW | PW | PW | PW | PW | PW |
| Gypsum plaster mixture (without MHEC) | 1000 | 1000 | 1000 | 1000 | 1000 | 1000 |
| MHEC Example 2a (comparative example) | 2.5 | — | — | 2.425 | — | — |
| MHEC Example 2b (1.2% dispersion) | — | 2.5 | — | — | 2.425 | — |
| MHEC Example 2c (3% dispersion) | — | — | 2.5 | — | — | 2.425 |
| Cothickener | — | — | — | 0.075 | 0.075 | 0.075 |
| Water[1] | 620 | 620 | 620 | 660 | 660 | 660 |
| Properties: | without cothickener | | | with cothickener | | |
| Consistency | good | delayed thickening, plasticizing | delayed thickening, plasticizing | very good | delayed thickening, somewhat more strongly plasticizing than 13 | delayed thickening, somewhat more strongly plasticizing than 13 |
| Working | satisfactory | easier & better than 10 | easier & better than 10 | good | easier & better than 13 | easier & better than 13 |
| Non-sag performance | satisfactory | satisfactory | satisfactory | good | good | good |
| Agglomeration | yes | yes | yes | slight | slight | slight |

[1] Mixing the mortar: 45 s of manual stirring

TABLE 3

|  |  | Example No. | | |
| --- | --- | --- | --- | --- |
|  |  | 16 MHEC Example 3a (comparative example) +1.5% cothickener | 17 MHEC Example 3b (1% dispersion) +1.5% cothickener | 18 MHEC Example 3c (3% dispersion) +1.5% cothickener |
| Masterbatch 1[1] | Time [min] | | | |
| Spraying[2] | 0 | good spraying picture, coalesces well | more uniform spraying picture, easier than 16 | somewhat more liquid than 16 and 17, spraying picture somewhat less uniform |
| 1st leveling | +5 | tacky, difficult, nodules | uniform leveling, some nodules | tackier, but sets up better than 17 |
| 2nd leveling | +81 | difficult | easier than 16, surface sets up better | somewhat more difficult than 17 |
| Trimming | +32 | somewhat difficult | good, sets up well | easier than 16 but more difficult than 17 |

TABLE 3-continued

| | Time [min] | 16 MHEC Example 3a (comparative example) Masterbatch 1[1] +1.5% cothickener | 17 MHEC Example 3b (1% dispersion) +1.5% cothickener | 18 MHEC Example 3c (3% dispersion) +1.5% cothickener |
|---|---|---|---|---|
| Felting | +19 | OK, plaster milk OK | OK, plaster milk OK | OK, plaster milk OK |
| Smoothing | +20 | good | good, much easier than 16 | comparable to 16, some undissolved particles |
| Overall assessment | 157 | good | markedly better than 16 | somewhat better than 16 |

[1] Gypsum plaster mixture (without MHEC) containing LP agent and starch ether
[2] Rendering machine: PFT G4/hose length: 15 m; foundation: aerated concrete pretreated 1:3 with Tiefengrund LF
Water throughput: from 800 to 820 l/h; delivery pressure: from 10 to 11 bar, spread: from 170 to 180 mm

TABLE 4

| | Time [min] | 19 MHEC Example 3a (without dispersion) + 1.5% cothickener | 20 MHEC Example 3b (1% dispersion) + 1.5% cothickener | 21 MHEC Example 3a (without dispersion) + 1.5% cothickener + 1% dispersion powder | 22 MHEC Example 3a (without dispersion) + 1.5% cothickener + 33% dispersion powder |
|---|---|---|---|---|---|
| Spraying[2] | 0 | somewhat tacky, does not coalesce well | good spraying picture, very uniform | somewhat tacky, does not coalesce well | somewhat better than 19 and 21 |
| 1st leveling | +5 | difficult and compact | markedly easier than 19 | difficult and compact | somewhat better than 19 and 21, but markedly more difficult than 20 |
| 2nd leveling | +80 | compact, sets up well | better than 19, sets up well | compact, sets up well | somewhat compact, sets up well |
| Trimming | +30 | trims well | trims well | trims well | trims well |
| Felting | +20 | good, plaster milk OK | good, plaster milk OK | good, plaster milk OK | good, plaster milk OK |
| Smoothing | +20 | good | good | good | |
| Overall assessment | 155 | deficient | good, markedly better than 19 | deficient, analogous to 19 | satisfactory, somewhat better than 19 but worse than 20 |

[1] Gypsum plaster mixture (without MHEC) containing LP agent and starch ether
[2] Rendering machine: PFT G4/hose length: 15 m; foundation: aerated concrete pretreated 1:3 with Tiefengrund LF
Water throughput: from 780 to 800 l/h; delivery pressure: from 11 to 13 bar, spread: from 160 to 190 mm

The invention claimed is:

1. A process for physically modifying a moist cellulose ether, comprising
    a) intensively mixing the moist cellulose ether having a moisture content of from 30 to 75% at a temperature of from 20 to 100° C., with from 0.1 to 2% by weight, based on dry cellulose ether, of an additive or an additive mixture comprising an aqueous or organic suspension or solution until the additive or additive mixture is uniformly incorporated with the moist cellulose ether to thus form a cellulose ether mixture consisting essentially of the moist cellulose ether and the additive or additive mixture, wherein the additive or additive mixture comprises synthetic polymers of homopolymers or copolymers of vinyl acetate, vinyl acetate-maleate copolymers, ethylene-vinyl acetate copolymers, acrylate and/or methacrylate homopolymers and/or copolymers or polyurethanes, or mixtures thereof, and
    b) grinding and drying the cellulose ether mixture.

2. The process of claim 1, wherein the moist cellulose ether is selected from the group consisting of methyl cellulose, ethyl cellulose, propyl cellulose, butyl cellulose, carboxymethyl cellulose, hydroxyethyl cellulose, methylhydroxyethyl cellulose, methylhydroxypropyl cellulose, ethylhydroxyethyl cellulose, and mixtures thereof.

3. The process of claim 1, wherein the cellulose ether mixture further consists essentially of an organic suspending agent, wherein the process further comprises the steps of suspending the moist cellulose ether at a temperature of from 20 to 60° C. in an organic suspending agent before said mixing, and separating the organic suspending agent before the drying.

4. The process claim 3, wherein the organic suspending agent is selected from the group consisting of acetone, diethyl ether dimethoxyethane, aliphatic hydrocarbons, cyclic hydrocarbons, aromatic compounds, and mixtures thereof.

5. The process of claim 1, wherein the drying and/or grinding comprises a grinding mill temperature of at least 60° C.

6. A process for physically modifying a moist cellulose ether, comprising
    a) intensively mixing the moist cellulose ether having a moisture content of from 30 to 75% at a temperature of from 20 to 100° C., with from 0.1 to 2% by weight, based on dry cellulose ether, of an additive or an additive mixture comprising an aqueous or organic suspension or solution until the additive or additive mixture is uniformly incorporated with the moist cellulose ether to thus form a cellulose ether mixture consisting essentially of the moist cellulose ether and the additive or additive mixture, wherein the additive or additive mixture consists essentially of synthetic polymers of homopolymers or copolymers of vinyl acetate, vinyl acetate-maleate copolymers, ethylene-vinyl acetate copolymers, acrylate and/or methacrylate homopolymers and/or copolymers or polyurethanes, or mixtures thereof, and b) grinding and drying the cellulose ether mixture.

7. The process of claim 6, wherein the moist cellulose ether is selected from the group consisting of methyl cellulose, ethyl cellulose, propyl cellulose, butyl cellulose, carboxymethyl cellulose, hydroxyethyl cellulose, methylhydroxyethyl cellulose, methylhydroxypropyl cellulose, ethylhydroxyethyl cellulose, and mixtures thereof.

8. The process of claim 6, wherein the cellulose ether mixture further consists essentially of an organic suspending agent, wherein the process further comprises the steps of suspending the moist cellulose ether at a temperature of from 20 to 60° C. in an organic suspending agent before said mixing, and separating the organic suspending agent before the drying.

9. The process claim 6, wherein the organic suspending agent is selected from the group consisting of acetone, diethyl ether, dimethoxyethane, aliphatic hydrocarbons, cyclic hydrocarbons, aromatic compounds, and mixtures thereof.

10. The process of claim 6, wherein the drying and/or grinding comprises a grinding mill temperature of at least 60° C.

11. The process of claim 6 wherein the additive includes a synthetic polymer based an vinyl acetate.

12. The process of claim 6 wherein the additive includes a synthetic polymer based on vinyl acetate-maleate copolymers.

13. The process of claim 6 wherein the additive includes a synthetic polymer based on ethylene-vinyl acetate copolymers.

14. The process of claim 6 wherein the additive includes a synthetic polymer based on acrylate and/or methacrylate homopolymers and/or copolymers or polyurethanes.

15. The process of claim 6 wherein the additive includes a polyvinyl acetate-ethylene copolymer.

16. A process for physically modifying a moist cellulose ether consisting essentially of a) intensively mixing the moist cellulose ether having a moisture content of from 30 to 75% at a temperature of from 20 to 100° C., with from 0.1 to 2% by weight, based on dry cellulose ether, of an additive or an additive mixture comprising an aqueous or organic suspension or solution until the additive or additive mixture is uniformly incorporated with the moist cellulose ether to thus form a cellulose ether mixture consisting essentially of the moist cellulose ether and the additive or additive mixture, wherein the additive or additive mixture comprises synthetic polymers of homopolymers or copolymers of vinyl acetate, vinyl acetate-maleate copolymers, ethylene-vinyl acetate copolymers, acrylate and/or methacrylate homopolymers and/or copolymers or polyurethanes, or mixtures thereof, and b) grinding and drying the cellulose ether mixture at a temperature of 80° C. to 160° C.

* * * * *